Figure 1:
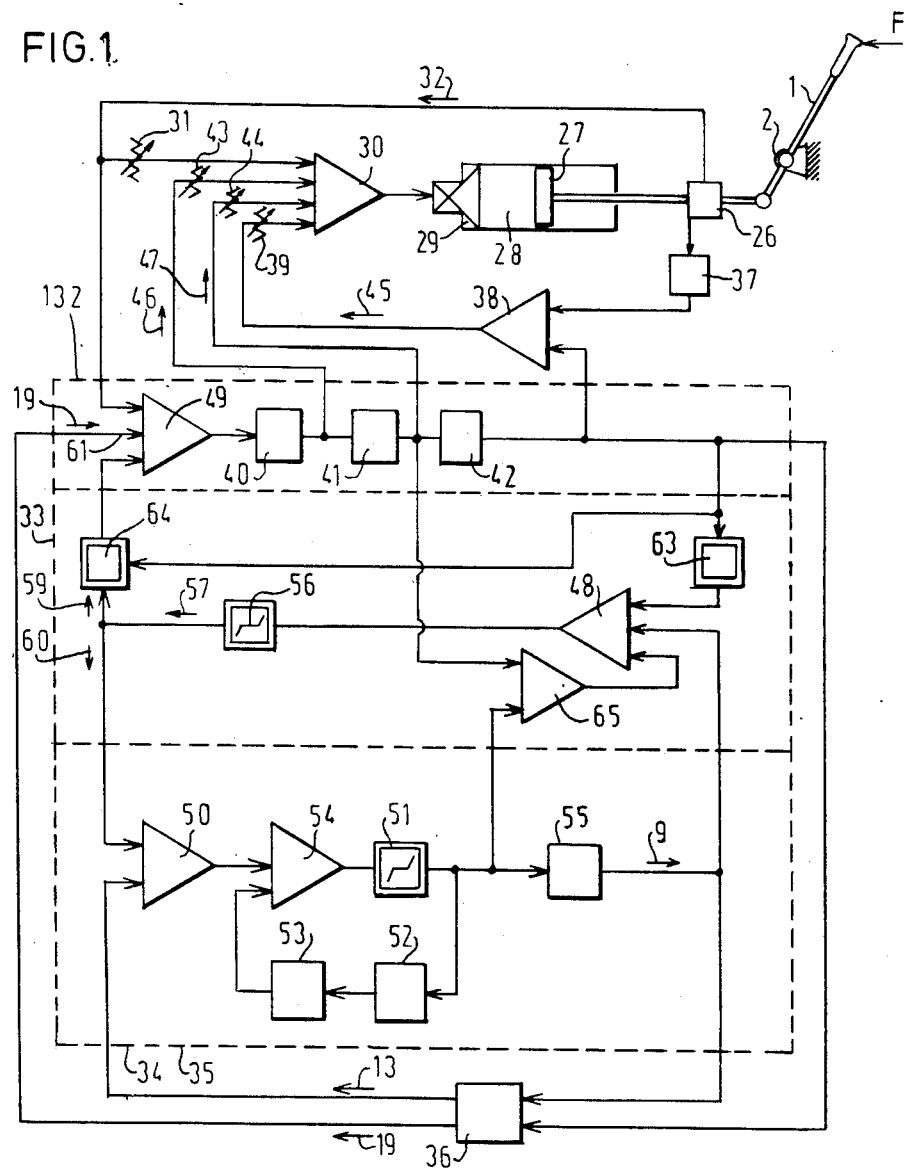

United States Patent [19]

de Vries

[11] Patent Number: 4,758,164

[45] Date of Patent: Jul. 19, 1988

[54] HYBRID FLIGHT SIMULATOR

[75] Inventor: Luitzen de Vries, Amstelveen, Netherlands

[73] Assignee: Fokker B.V., Netherlands

[21] Appl. No.: 854,524

[22] Filed: Apr. 22, 1986

[30] Foreign Application Priority Data

May 3, 1985 [NL] Netherlands .......................... 8501271

[51] Int. Cl.⁴ .............................................. G09B 9/08
[52] U.S. Cl. ..................................................... 434/45
[58] Field of Search ........................................... 434/45

[56] References Cited

U.S. PATENT DOCUMENTS 3,463,866  8/1969  Staples ................................ 434/45

Primary Examiner—Leo P. Picard
Attorney, Agent, or Firm—John P. Snyder

[57] ABSTRACT

A flight simulator includes a servo system connected with a control element, an electrical analog providing inputs to the servo system and receiving inputs from a digital computer and including a combining circuit, a divider and two integrators. Outputs from the two integrators to the computer are of digital form and the second integrator preferably is itself of digital form.

7 Claims, 2 Drawing Sheets

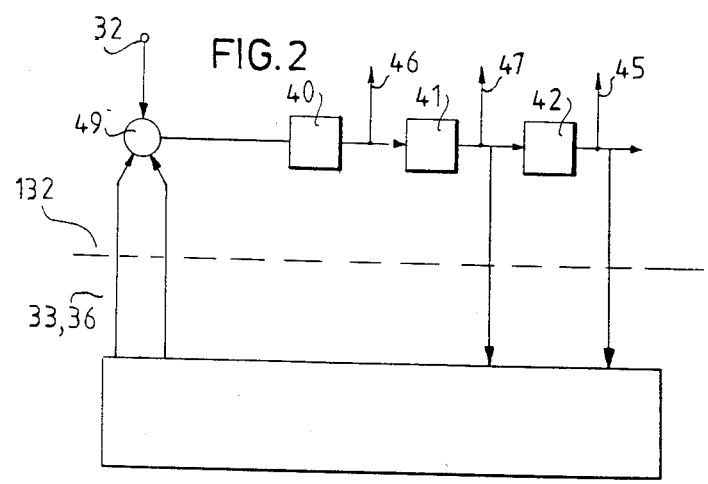
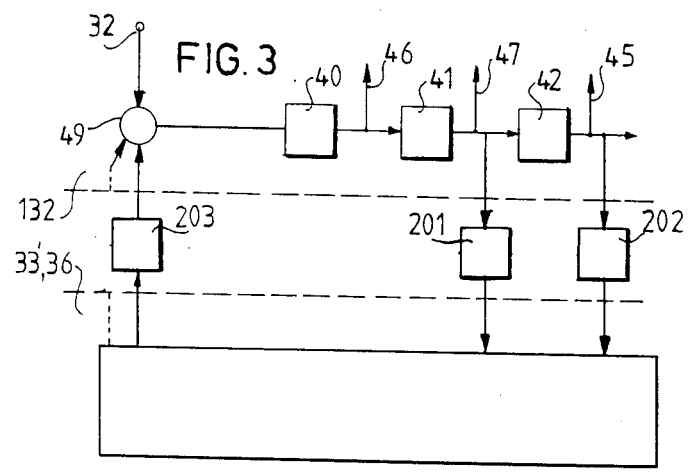
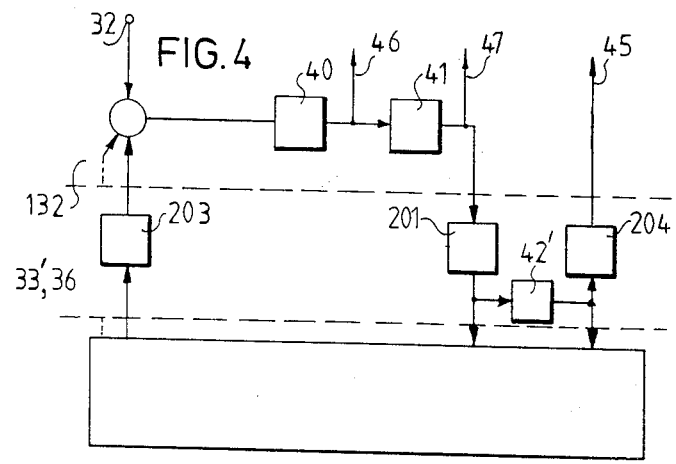

HYBRID FLIGHT SIMULATOR

The invention relates to a flight simulator, comprising:
(1) at least one element, the position of which is variable during the flight, such as a control member, for example a control column, with which a steering surface is coupled;
(2) an associated programmable servo-means coupled with the or each element, said means comprising:
   (a) an amplifier;
   (b) a servo-motor coupled with the output thereof;
   (c) a force-electric signal converter arranged between the servo-motor and the element and having its output coupled with a first input of the amplifier;
   (d) a position-electric signal converter arranged on the element and having its output coupled with a second input of the amplifier; and
   (e) a computer calculating a force associated with the condition of the element on the basis of the flight conditions and the relevant properties of the or each element and applying a corresponding signal to the amplifier; and which is coupled with the amplifier via an electric analogon representing the relevant mechanical properties of the element concerned, which analogon comprises:
      (1) a divider for dividing the input signal by a value proportional to the desired mass of the element;
      (2) a first integrator connected to the output of the divider; and
      (3) a second integrator connected to the output of the first integrator and having its output coupled with the input of the amplifier.

Such a flight simulator is known from the American U.S. Pat. No. 4,398,889 in the name of the present applicant. This known system is capable of a perfectly faithful simulation of all practical systems and moreover imposes no limitations to the order of the system to be simulated. Furthermore this known flight simulator has no stability problems, irrespective of the order of the simulated system.

The underlying requirement of the invention is to perform digitally as many elements of the flight simulator as possible, because a digital embodiment gives the advantage of a greater flexibility and in addition presents no stability problems, such as drift and the like.

In this respect the invention proposes to give the flight simulator of the stated type a form such that the computer is of the digital type and that the output of the first integrator is connected via an analog/digital converter to an input of the computer and that the or each computer output concerned is connected via a digital-/analog converter to the electric analogon. It should be understood that the term "computer" must be conceived more broadly than as the unit which is designated as such in the American patent application already referred to. This aspect will be discussed again hereinafter with reference to FIG. 1.

The output of the second integrator can also be connected via an analog/digital converter with the computer. This solution within the framework of the invention does however have a certain limitation. As a result of the limited resolution of this analog/digital converter the known quantization noise occurs at the output. This noise can become perceptible in the simulation, which does not fit in with the requirement of a completely faithful simulation. In order to solve this problem the invention proposes a variant which displays the feature that the second integrator is of the digital type, that it is connected with its input to the output of the analog/-digital converter and with its output is connected via a digital/analog converter to an input of the computer and an input of the amplifier. It will be apparent here that the quantization noise on the output of the analog/-digital converter remains on the output of the first integrator. As a consequence of the fact that an integrator can be regarded as a filter with a slope of 6 dB/octave, the noise is now filtered. Amplification of the thus obtained position signal is found not to lead to perceptible quantization noise.

The invention will now be elucidated with reference to a drawing, in which:
FIG. 1 shows the known flight simulator according to the American U.S. Pat. No. 4,398,889;
FIG. 2 shows the part of this known flight simulator at which the invention is aimed;
FIG. 3 shows a first embodiment of the invention; and
FIG. 4 a preferred embodiment.

FIG. 1 shows a fourth order flight simulator in accordance with the American U.S. Pat. No. 4,398,889. The pilot exerts a force F on the control column 1, which is coupled through the fulcrum 2 and a power pick-up 26 with the piston 27 of the linear hydraulic motor 28, the servo valve 29 of which can be controlled from the amplifier 30. The force electric signal converter 26 is connected through a potentiometer 31 to an inverting input of the amplifier 30. Without further explanation it will be obvious that the loop described constitutes a force-servo-loop or a force-negative feedback loop. The force pick-up 26 provides a signal 32 corresponding to the measured force. In this way static load errors which may be due to the compressibility of the oil employed are corrected. The signal 32 is also applied to a block 132 representing an electrical analogon or substitute diagram of the forward system 6.

As will be described in further detail the analogon 132 is connected with an analogon 33 representing the properties of the coupling 4. This analogon 33 is in turn connected with an analogon 34 representing the properties of the aft system 7. It should be emphasised that the analogon 34 may be formed by a number of blocks 35 corresponding to the order of the aft system to be simulated, each block representing in itself a second order system as will be discussed hereinafter with reference to FIG. 7. Thus, by cascading, any desired order of the aft system can be obtained. The "lower" block 35 of the analogon 34 is connected to a computer 36, which serves for the simulation of the flight conditions.

With the control-column 1 is furthermore coupled a position-electric signal converter 37, the output of which is connected through an amplifier 38 and a potentiometer 39 to an input of the amplifier 30.

The analogon 132 of the forward system comprises a divider 40 for dividing the input signal by a value proportional to the desired mass of the control-column 1, a first integrator 41 connected to the output of the divider 40 and a second integrator 42 connected to the output of the first integrator, the output of said second integrator being connected through the amplifier 38 and the potentiometer 39 to an input of the amplifier 30.

In the present embodiment the output of the divider 40 and the output of the integrator 41 are also coupled with the inputs of the amplifier 30, that is to say, through potentiometers 43 and 44 respectively. The output signal 45 of the amplifier 38 corresponds, as will be evident after the foregoing, to the difference between the desired and the measured positions of the control-column 1. The signals 46 and 47 applied to the potentiometers 43 and 44 respectively serve to stimulate a quick response to changes of the system.

The coupling analogon 33 is constructed in the form of a first combining circuit 48, the first input of which is connected through a non-linear circuit 63 to the output of the second integrator 42. The analogon 132 comprises a second combining circuit 49, the output of which is connected to the input of the divider 40 and a first input of which is connected to the force-electric signal converter 26 and a second input of which is connected to the output of the first combining circuit 48. The output of the first combining circuit 48 is connected through a non-linear simulation circuit 56 corresponding to the circuit 51 to be described hereinafter to the third combining circuit 50 and through a second, non-linear circuit 64 controllable by the output signal of the second integrator to the second combining circuit 49.

The unit 35 comprises a third combining circuit 50, one input of which is coupled with the output of the first combining circuit 48 and the second input of which is connected to the output of the computer 36 and a second order circuit, the input of which is connected to the output of the third combining circuit 50 and the output of which is connected to an input of the computer and a second input of the first combining circuit.

The said second order circuit comprises a simulation circuit 51, which only provides an output signal when the absolute value of the input signal exceeds a preselected value, whilst the sign of the output signal is uniquely related with the sign of the input signal and said preselected value corresponds to a static friction. The simulation circuit 51 comprises a negative feedback circuit formed by a differentiator 52, an adjustable amplifier 53 and a difference amplifier 54. With regard to the transfer function of the simulation circuit it is noted that the dead band and the slope are both independently adjustable. The dead band corresponds to the static friction and the slope to the reciprocal value of the damping.

The attenuator 53 serves to set the mass $K_2$ of the steering surface. The output of the simulation circuit 51 is connected to the input of an integrator 55, the output of which is coupled with said input of the computer and with said second input of the first combining circuit 48.

The output signal of the second integrator 42 is furthermore applied to a further input of the computer 36. A further output of the computer provides $F_{syst.2}$ 19, which signal is applied through the input 61 to the second combining circuit 49. In general, various "ideal", i.e. desired or calculated, position signals are applied to the computer, that is to say, not from for example the position pick-up 37, since this provides a realistic, non-ideal position signal. The signal 9 at the output of the integrator 55 is also such a signal, that is to say, the "position" of the analogon 34, 35.

The two inputs of a fourth combining circuit 65 are connected to the output of the first integrator 41 and to the output of the simulation circuit 51 respectively, while the output is connected to an input of the first combining circuit 48. The amplification of the circuit 65, which may be adjustable, represents the damping of the coupling.

At the output of the non-linear circuit 56 is available a signal 57 which corresponds to the force $F_1 = F_2$. This signal can be thought of as being split up from the branching 58 into a signal 59 corresponding to $F_1$ and an identical signal 60 corresponding to $F_2$.

The second combining circuit 49 is provided in the present embodiment with a further input 61 to which a signal 19 corresponding to $F_{syst.1}$ can be applied by the computer 36. The signal 9 at the output of the integrator 55 corresponds to $x_2$. The signal 13 at the output of the computer 36 corresponds to $F_{syst.2}$. The signal 9 corresponds with the position of the analogon, i.e. to the desired position of the control column.

FIG. 2 shows the part of the circuit in accordance with FIG. 1, to which part the invention relates. In FIG. 2 the same reference symbols are used and the various parts will not be named and discussed again. It can suffice to refer to the combining circuit 49, the divider 40, the integrator 41 and the integrator 42. As also can be found with a reference to FIG. 1, an exchange of signals occurs between the analogon 132 and the analogon 33 with the computer 36, the latter elements being regarded in a wider sense as "the computer". While in the known art according to FIG. 1 the analogon 33 takes an analog form, in the technique according to the invention the implementation is digital. In anticipation of the FIGS. 3 and 4 it is meanwhile noted that an analog unit in accordance with the known art will be indicated in the FIGS. 3 and 4 by the same reference number with an accent added.

FIG. 3 shows an embodiment in which the output of the analog first integrator 41 is connected via an analog/digital converter 201 to the unit 33', 36, in this example operating completely digitally, while the output of the analog second integrator 42 is connected via an analog/digital converter 202 with this unit 33', 36. An output of the unit 33', 36 is connected to the input of the combining circuit 49 via a digital/analog converter 203.

The preferred embodiment according to FIG. 4 differs from the embodiment in accordance with FIG. 3 in that the analog integrator 42 is replaced by a digital integrator 42', which is connected with its input to the output of the analog/digital converter 201 and with its output is connected with the input concerned of the unit 33', 36. Its output is also connected to the input of a digital/analog converter 204, the output of which corresponds functionally to the output of the analog integrator 42 as according to FIG. 3, this being indicated in the figures with the reference number 45.

The difference between the FIGS. 3 and 4 will be apparent: quantization noise at the output of the integrator 202 is for a very considerable part suppressed by making use of a filtered version of the output signal of the analog/digital converter 201, whereby the quantization noise present therein is suppressed by 6 dB/octave.

I claim:
1. Flight simulator, comprising:
   (1) at least one element, the position of which is variable during the flight, such as a control member, for example a control column, with which a steering surface is coupled;
   (2) an associated programmable servo-means coupled with the or each element, said means comprising:
      (a) an amplifier;
      (b) a servo-motor coupled with the output thereof;
      (c) a force-electric signal converter arranged between the servo-motor and the element and hav- ing its output coupled with a first input of the amplifier;

(d) a position-electric signal converter arranged on the element and having its output coupled with a second input of the amplifier; and (e) a computer calculating a force associated with the condition of the element on the basis of the flight conditions and the relevant properties of the or each element and applying a corresponding signal to the amplifier; and which is coupled with the amplifier via an electric analogon representing the relevant mechanical properties of the element concerned, which analogon comprises:

(1) a divider for dividing the input signal by a value proportional to the desired mass of the element;

(2) a first integrator connected with the output of the divider; and (3) a second integrator connected with the output of the first integrator and having its output coupled with the input of the amplifier, characterised in that said computer is of the digital type and that the output of said first integrator is connected via an analog/digital converter to an input of said computer and that the or each computer output concerned is connected via a digital/analog converter to said electrical analogon.

2. Flight simulator as claimed in claim 1, characterised in that the second integrator is of the digital type, that it is connected with its input to the output of the analog/digital converter and is connected with its output via a digital/analog converter to an input of the computer and an input of the amplifier.

3. In a flight simulator which includes a manually operated control member and a servo means connected thereto for acting and reacting on the control member to simulate response of a controlled member such as a control surface under simulated flight conditions, said servo means including a servo valve, amplifier means for controlling the servo valve in response to a plurality of inputs thereto, computer means for producing flight simulating signals, electrical analog means for producing outputs signals feeding the amplifier means and including a combining circuit, a divider and first and second integrators, all in series, the combining circuit having an input from the computer means which represents simulated inertial forces acting on the controlled member and an input which represents manual input force applied to the control member, the divider dividing the output of of the combining circuit by a value representing the mass of the control member to produce a control member acceleration-related signal applied to the first integrator whereby the output of the first integrator is a control member velocity-related signal and the output of the second integrator is a control member position-related signal, the acceleration-related signal and the velocity-related signal being connected as inputs to the amplifier means and the position-related signal being applied to the amplifier means as a control member position error signal; the improvement wherein:

the computer means is of the digital type and including analog-to-digital converter means for applying the control member velocity-related and the control member position-related signals in digital form to the computer means, and digital-to-analog converter means for connecting outputs of the computer means to the combining means.

4. In a flight simulator as defined in claim 3 wherein the second integrator is of the digital type and including analog-to-digital converter means connecting the control member velocity-related signal to the second integrator means.

5. In a flight simulator which includes a manually operated control member and a servo means connected thereto for acting and reacting on the control member to simulate response of a controlled member such as a control surface under simulated flight conditions, computer means for producing flight simulating signals, electrical analog means for producing outputs signals feeding the servo means and including a combining circuit, a divider and first and second integrators, all in series, the combining circuit having an input from the computer means which represents simulated inertial forces acting on the controlled member and an input which represents manual input force applied to the control member, the divider dividing the output of of the combining circuit by a value representing the mass of the control member to produce a control member acceleration-related signal applied to the first integrator whereby the output of the first integrator is a control member velocity-related signal and the output of the second integrator is a control member position-related signal, the acceleration-related signal, the velocity-related signal and the position-related signal being applied as inputs to the servo means and the control member velocity-related signal and the control member position-related signal also being applied as inputs to the computer means; the improvement wherein:

the computer means is of the digital type, means for converting the outputs of the computer means to the electrical analog means to analog form and means for converting the outputs from the electrical analog means to the computer means to digital form.

6. In a flight simulator as defined in claim 5 wherein the servo means is of analog form.

7. In a flight simulator as defined in claim 6 wherein the second integrator is of digital form and including an analog-to-digital converter means for converting the velocity-related signal to digital form for application as the input to the second integrator means.

* * * * *